EBNER & LEUTHY.
Harvester Rake.
No. 25,815.
Patented Oct. 18, 1859.
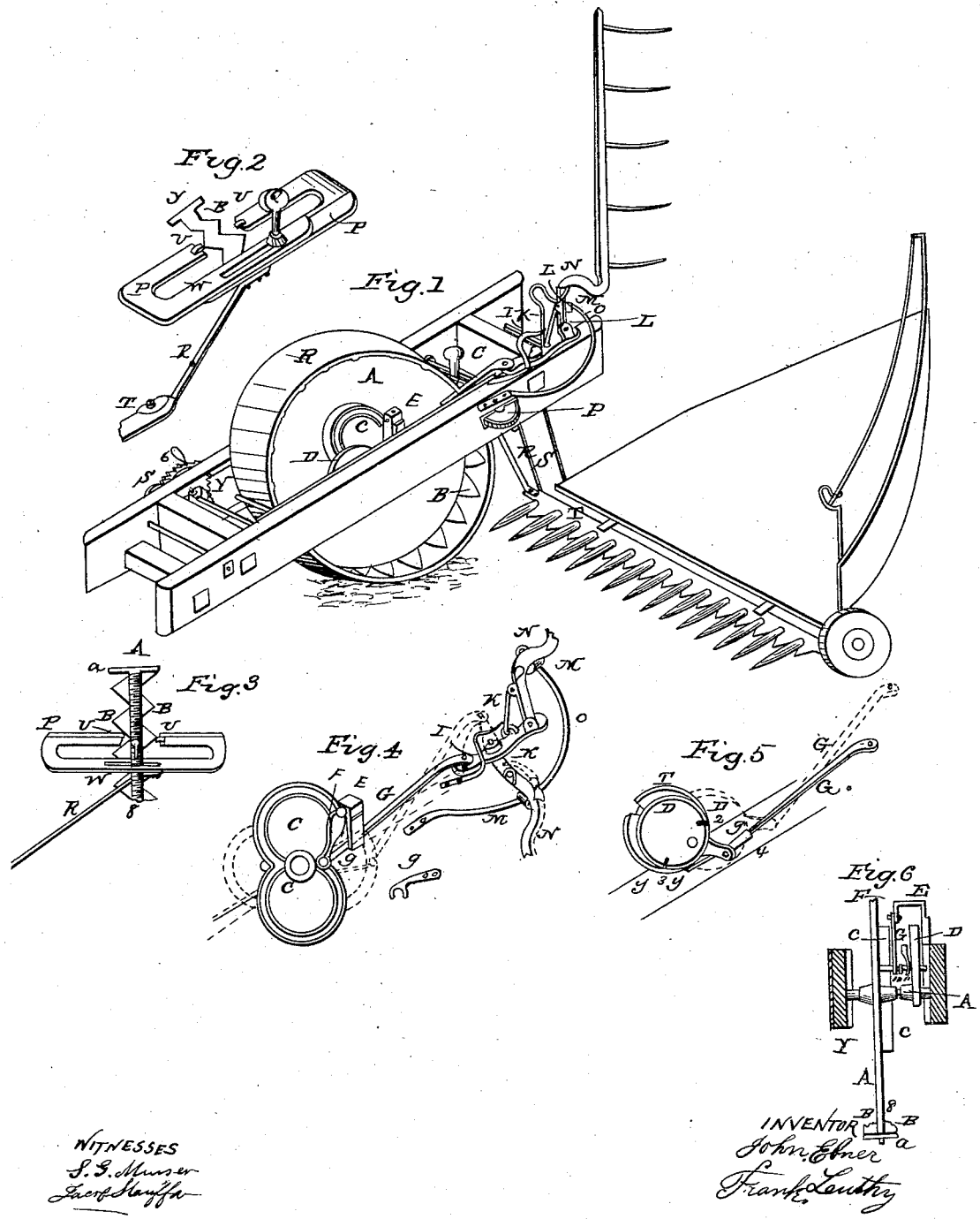
WITNESSES
S. S. Musser
Jacob Stauffer
INVENTOR
John Ebner
Frank Leuthy

UNITED STATES PATENT OFFICE.

JOHN EBNER AND F. LEUTHY, OF LANCASTER, PENNSYLVANIA.

IMPROVEMENT IN HARVESTERS.

Specification forming part of Letters Patent No. 25,815, dated October 18, 1859.

*To all whom it may concern:*

Be it known that we, JOHN EBNER and FRANK LEUTHY, both of the city of Lancaster, in the county of Lancaster and State of Pennsylvania, have jointly invented certain new and useful Improvements on a Combined Self-Raking Reaping-Machine; and we do hereby declare that the following is a full, clear, and exact description of the construction and operation of the same, reference being had to the annexed drawings, making a part of this specification, in which—

Figure 1 shows the frame-work and position of the toothed driving-wheel A, horizontal vibrating bar P, raking attachment, platform, and cutter-bar T, and connecting-rod R, &c., in their relative position.

Fig. 2 shows the horizontal bar P detached, the sliding pieces drawn apart by means of the slot W and binding-screw Q, by which the anti-friction rollers v v can be adjusted or thrown out of gear. Fig. 3 shows the same in gear, the anti-friction rollers U U in contact with the smooth thick edges of the teeth B, which teeth are cast in the rim of the wheel inside, alternating in a zigzag manner from the center 8 of the wheel A, so that the one roller is on the apex of a tooth and the other at the base between the opposite teeth, giving the bar P a right and left motion, sliding in and supported by boxes fitted into the frame of the machine. R shows the attachment of the connecting-rod by which it imparts its motion to the cutter-bar T.

Fig. 4 shows the grooved double eccentric C C, cast with the wheel A; E, the upright, bent inward and down at right angles, to which the vibrating bar F is pivoted. F has a headed peg, 10, for the attachment of the combined eccentric-rod G g on one side below, and an anti-friction roller on the other fitting into the eccentric-groove C. The dotted lines illustrate the change of position of the eccentric C, the rod G, swivel H, and rake N.

Fig. 5 shows the grooved edge and entering screw of the sliding strap laid open, of the single or solid banded eccentric D, the change of position of its arm 4, and the rod G, drawn reversed to show the side facing of the double eccentric C.

Fig. 6 is a vertical section of the wheel A, frame side plates, Y, in which the wheel A has its bearings, the attached double eccentric C, and the single eccentric D, with their headed pegs 10 11, rod G, upright E, and vibrating rod F, in their respective positions. The double eccentric C is used in heavy or thickly-standing grain, and clears the platform twice in each revolution of the driving-wheel A. The single or banded eccentric D is used in thin standing grain, raking but once to each revolution. This change is readily effected by slipping the forked end g of the rod G from one peg, 10, to the other, 11.

The raking operation is simple. On the frame of the machine rests the swivel H, pivoted at X, connected by one end to the rod G, and the bent rake-handle N is hinged on the other end. An anti-friction roller, M, is under the end N, and a hinged hook, K, on top. The rod G moves the swivel carrying the rake backward over the platform under the bent banister-rod g on the outer rim of the platform, and traversing by its roller M over a supporting and inclined guiding-rod, O, attached to the side of the machine, on which it is pushed to a nearly-vertical position, when the hook K drops into a catch, Z, on the swivel, which keeps the rake in a vertical position until it comes in contact with the bent tripper I in its forward motion. This tripper I unships the hook K and the rake drops over the guards on the platform—a spring may be applied to break the fall of the rake as it drops—and repeats the operation, which will be readily comprehended on inspection of the several drawings. The rake is thus out of the way while coming forward, and can be adjusted so as to perform with the greatest precision.

The end N may be a cast socket for the insertion of the rake.

The side plates, Y, attached at one end to the inside of the frame of the machine by pivot-bolts supporting the bearings of the wheel A on each side, as also the eccentrics and upright E, have their other loose ends from the frame, but united by a cross-bar in front of the wheel and cogged, forming a double rack. A handled ratchet-wheel, 6, has two small cogged wheels, 7, on its shaft to raise or lower the side plates, Y. The click 5 holds the same in position. The motion imparted by the zigzag teeth is similar in principle to the other motions of the kind, as is the arrangement of the cutter-bar and sickles.

Having fully described our improvement in automatic rakes for harvesters, we do not claim separately the devices employed; but What we do claim, and desire to secure by Letters Patent, is—

The arrangement of the three eccentrics C, C, and D, revolving with the shaft of the driving-wheel, in combination with the rake-connecting mechanism, constructed and operating in the manner described.

JOHN EBNER.
FRANK LEUTHY.

Witnesses:
S. G. MUSSER,
JACOB STAUFFER.